US009017888B2

(12) United States Patent
Yoshida

(10) Patent No.: US 9,017,888 B2
(45) Date of Patent: Apr. 28, 2015

(54) FUEL CELL SYSTEM

(75) Inventor: Michio Yoshida, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 305 days.

(21) Appl. No.: 12/934,460

(22) PCT Filed: Mar. 3, 2009

(86) PCT No.: PCT/JP2009/053963
§ 371 (c)(1), (2), (4) Date: Sep. 24, 2010

(87) PCT Pub. No.: WO2009/119259
PCT Pub. Date: Oct. 1, 2009

(65) Prior Publication Data

US 2011/0014536 A1 Jan. 20, 2011

(30) Foreign Application Priority Data

Mar. 25, 2008 (JP) ................................ 2008-078252

(51) Int. Cl.
*H01M 8/04* (2006.01)

(52) U.S. Cl.
CPC ........ *H01M 8/0494* (2013.01); *H01M 8/04089* (2013.01); *H01M 8/04223* (2013.01); *H01M 8/04313* (2013.01); *H01M 8/04395* (2013.01); *H01M 8/04619* (2013.01); *H01M 8/04798* (2013.01); *H01M 8/0488* (2013.01); *Y02E 60/50* (2013.01)

(58) Field of Classification Search
USPC .................................................... 429/22, 429
See application file for complete search history.

(56) References Cited

U.S. PATENT DOCUMENTS

2004/0219406 A1* 11/2004 Sugawara et al. ............... 429/22
2005/0048335 A1* 3/2005 Fields et al. .................... 429/22
2006/0194082 A1* 8/2006 Tucker et al. ..................... 429/9
2006/0210849 A1* 9/2006 Bono ............................. 429/22

(Continued)

FOREIGN PATENT DOCUMENTS

CN 1836345 A 9/2006
DE 11 2008 000096 T5 11/2009

(Continued)

OTHER PUBLICATIONS

Hirschenhofer et al., Fuel Cell Handbook, Nov. 1998.*

*Primary Examiner* — Jonathan G Leong
*Assistant Examiner* — James Erwin
(74) *Attorney, Agent, or Firm* — Kenyon & Kenyon LLP

(57) ABSTRACT

The invention prevents a fuel cell from going into a high-voltage state upon activation. In a fuel cell system having a fuel cell, a control unit comprises: a high-voltage-prevention unit that prevents, under a condition permitting high-voltage prevention, a high-voltage state by reducing the output voltage of the fuel cell to less than or equal to a predetermined high-voltage-prevention voltage; an output-limitation unit that limits the fuel cell output by reducing the amount of power generation by the fuel cell to less than or equal to a predetermined power generation limit, so that the oxidizing gas stoichiometric ratio is maintained within a predetermined allowable range; and a prohibition unit that prohibits the limitation by the output limitation unit for a predetermined period of time immediately after the fuel cell is activated and where the condition permitting high-voltage prevention is satisfied.

8 Claims, 4 Drawing Sheets

START
S101 INTERMITTENT FLAG SWITCHED FROM ON TO OFF
S102 PROHIBIT OUTPUT - LIMITATION PROCESSING
S103 START NORMAL OPERATION
S104 OXIDIZING GAS SUPPLY INSUFFICIENT ? YES / NO
S105 STOP PROHIBITION OF OUTPUT - LIMITATION PROCESSING
END

(56) References Cited

U.S. PATENT DOCUMENTS

| | | | | |
|---|---|---|---|---|
| 2006/0286418 | A1* | 12/2006 | Saeki et al. | 429/22 |
| 2007/0148512 | A1* | 6/2007 | Goto et al. | 429/23 |

FOREIGN PATENT DOCUMENTS

| | | | |
|---|---|---|---|
| JP | 9-120830 | A1 | 5/1997 |
| JP | 2005-100820 | A1 | 4/2005 |
| JP | 2005-235546 | A1 | 9/2005 |
| JP | 2006-309971 | A1 | 11/2006 |
| JP | 2007-165082 | A1 | 6/2007 |
| JP | 2009-129679 | A1 | 6/2009 |
| WO | 2008/018182 | A2 | 2/2008 |
| WO | 2008/029862 | A1 | 3/2008 |

* cited by examiner

1
BATTERY
52
DC/DC CONVERTER
51
INVERTER
53
M
54
A
V
2
HYDROGEN TANK
40
41
42
44
N
M
31
32
33
30
CONTROL UNIT
MEMORY
61
6
31
44
53
N
A
V
54

START
INTERMITTENT FLAG SWITCHED FROM ON TO OFF
S101
PROHIBIT OUTPUT - LIMITATION PROCESSING
S102
START NORMAL OPERATION
S103
S104
OXIDIZING GAS SUPPLY INSUFFICIENT ?
YES
NO
STOP PROHIBITION OF OUTPUT - LIMITATION PROCESSING
S105
END

FUEL CELL SYSTEM

This is a 371 national phase application of PCT/JP2009/053963 filed 3 Mar. 2009, which claims priority to Japanese Patent Application No. 2008-078252 filed 25 May 2008, the contents of which are incorporated herein by reference.

TECHNICAL FIELD

The present invention relates to a fuel cell system.

BACKGROUND ART

In recent years, a fuel cell system that utilizes as its energy source a fuel cell that generates power from the electrochemical reaction between reactant gases of fuel gas and oxidizing gas has been developed. In order to improve fuel efficiency, during low-load operations, such as idling, low-speed running, braking, etc., this type of fuel cell system performs an intermittent operation where power generation by the fuel cell is temporarily stopped and power is supplied to a load (e.g., vehicle motor) from a power storage means such as a secondary battery. When the reactant gases stop being supplied to stop the fuel cell operation during the above intermittent operation, the fuel cell goes into a high-voltage state. As the fuel cell deteriorates if it is left in a high-voltage state, it is necessary to prevent the fuel cell from going into a high-voltage state, for example, by decreasing its voltage, when stopping the fuel cell operation. In the fuel cell system disclosed in Patent Document 1 indicated below, a high-voltage state is prevented by only supplying a fuel cell with fuel gas after the stoppage of the fuel cell operation, so as to consume the oxidizing gas that remains in the fuel cell and output an electric current from the fuel cell.

Patent Document 1: Japanese laid-open patent publication No. 2005-100820

DISCLOSURE OF THE INVENTION

Problem to be Solved by the Invention

In a fuel cell stack whose operation is stopped, reactant gases remain, and the oxidizing gas that remains in the stack is consumed gradually after the stoppage of the operation. If the fuel cell is activated after the remaining oxidizing gas has been consumed, a lag in the supply of oxidizing gas occurs and the fuel cell is in a state of being short of oxidizing gas. If the oxidizing gas is insufficient, the amount of power generation by the fuel cell is limited to a value according to the actual flow rate of the oxidizing gas supplied, in order to maintain the oxidizing gas stoichiometric ratio. When the power generation amount is reduced, the output voltage increases, which could make the fuel cell go into a high-voltage state and thereby cause deterioration of the fuel cell.

The present invention has been made in order to solve the above problem in the prior art, and accordingly, an object of the present invention is to provide a fuel cell system that can prevent a fuel cell from going into a high-voltage state upon activation of the fuel cell.

Means for Solving the Problem

In order to solve the above problem, a fuel cell system according to the present invention has: a fuel cell that is supplied with reactant gases and generates power from an electrochemical reaction of the reactant gases; a high-voltage prevention means that, under a predetermined condition permitting high-voltage prevention, prevents a high-voltage state by reducing the output voltage of the fuel cell to less than or equal to a predetermined high-voltage-prevention voltage; a compressor that supplies the fuel cell with oxidizing gas which is one of the reactant gases; an output limitation means that limits an output from the fuel cell by reducing the amount of power generation by the fuel cell to less than or equal to a predetermined power generation limit which is lower than a required power generation amount, so that a stoichiometric ratio of the oxidizing gas is maintained within a predetermined allowable range; and a prohibition means that prohibits the limitation by the output limitation means for a predetermined period of time immediately after the fuel cell is activated and where the condition permitting high-voltage prevention is satisfied.

According to the invention configured as above, the limitation of the fuel cell output, which is carried out by reducing the amount of power generation by the fuel cell to less than or equal to the power generation limit so as to maintain the oxidizing gas stoichiometric ratio within a predetermined allowable range, can be prohibited for a predetermined period of time immediately after the activation of the fuel cell, under a predetermined condition permitting high-voltage prevention. Accordingly, it is possible to ensure that, upon activation of the fuel cell under the condition permitting high-voltage prevention, the output voltage of the fuel cell is reduced to less than or equal to the high-voltage-prevention voltage by the high-voltage prevention means. In other words, a high-voltage state can be prevented upon activation of the fuel cell. Meanwhile, when the predetermined period has passed, the amount of power generation by the fuel cell is reduced by the output limitation means to less than or equal to the power generation limit, and accordingly, unnecessary power loss can be reduced and high power generation efficiency can be realized.

In the above fuel cell system, the predetermined period of time may be a period from activation of the fuel cell until the oxidizing gas supply meets a required amount of supply. More specifically, the above fuel cell system may further have a determination means that determines whether or not the oxidizing gas supply meets the required amount of supply, and the above prohibition means may prohibit the above limitation by the output limitation means upon activation of the fuel cell until the determination means determines that the oxidizing gas supply meets the required amount of supply.

With this configuration, the limitation of the fuel cell output can be prohibited upon activation of the fuel cell until the shortage of the oxidizing gas supply has been solved.

The above fuel cell system may further have a rotation frequency sensor that detects the rotation frequency of the compressor motor, and the above determination means may determine that the oxidizing gas supply does not meet the required amount of supply if there is a gap between the rotation frequency detected by the rotation frequency sensor and the rotation frequency directed to the compressor.

With this configuration, the limitation of the fuel cell output can be prohibited upon activation of the fuel cell until the rotation frequency detected by the rotation frequency sensor approximates the rotation frequency directed to the compressor.

In the above fuel cell system, the determination means may determine that the oxidizing gas supply does not meet the required amount of supply if the rotation frequency detected by the rotation frequency sensor is smaller than the rotation frequency directed to the compressor.

With this configuration, the limitation of the fuel cell output can be prohibited upon activation of the fuel cell until the rotation frequency detected by the rotation frequency sensor reaches the rotation frequency directed to the compressor.

In the above fuel cell system, the predetermined period of time may be a period from activation of the fuel cell until both of the power generation limit and the required power generation amount for the fuel cell increase to greater than or equal to a high-voltage-prevention power generation amount which corresponds to the high-voltage-prevention voltage. More specifically, the above fuel cell system may further have a determination means that determines whether or not both of the power generation limit and the required power generation amount are greater than or equal to the high-voltage-prevention power generation amount, and the above prohibition means may prohibit the limitation by the output limitation means upon activation of the fuel cell until the determination means determines that the power generation limit and the required power generation amount are greater than or equal to the high-voltage-prevention power generation amount.

With this configuration, the limitation of the fuel cell output can be prohibited upon activation of the fuel cell until the power generation limit and the required power generation amount reach or exceed the high-voltage-prevention power generation amount.

In the above fuel cell system, the activation of the fuel cell may be an activation following the completion of an intermittent operation in the fuel cell.

The above fuel cell system may further have a cancellation means that cancels the prohibition by the prohibition means when a predetermined period of time has passed from the activation of the fuel cell.

With this configuration, it is possible to prevent a burdensome output from continuing for a long time, and to consequently reduce deterioration of the fuel cell.

Effect of the Invention

The present invention can prevent a fuel cell from going into a high-voltage state upon activation of the fuel cell.

DESCRIPTION OF REFERENCE NUMERALS

1 . . . Fuel cell system, 2 . . . Fuel cell, 6 . . . Control unit, 31 . . . Compressor, 53 . . . Traction inverter, 54 . . . Traction motor, 61 . . . Memory, and N . . . Rotation frequency sensor.

BEST MODE FOR CARRYING OUT THE INVENTION

Now, a preferred embodiment of the fuel cell system according to the present invention will be described with reference to the attached drawings. This embodiment explains the case where the fuel cell system according to the present invention is used as an on-vehicle power generation system for a fuel cell vehicle (FCHV: Fuel Cell Hybrid Vehicle).

Figure 1:
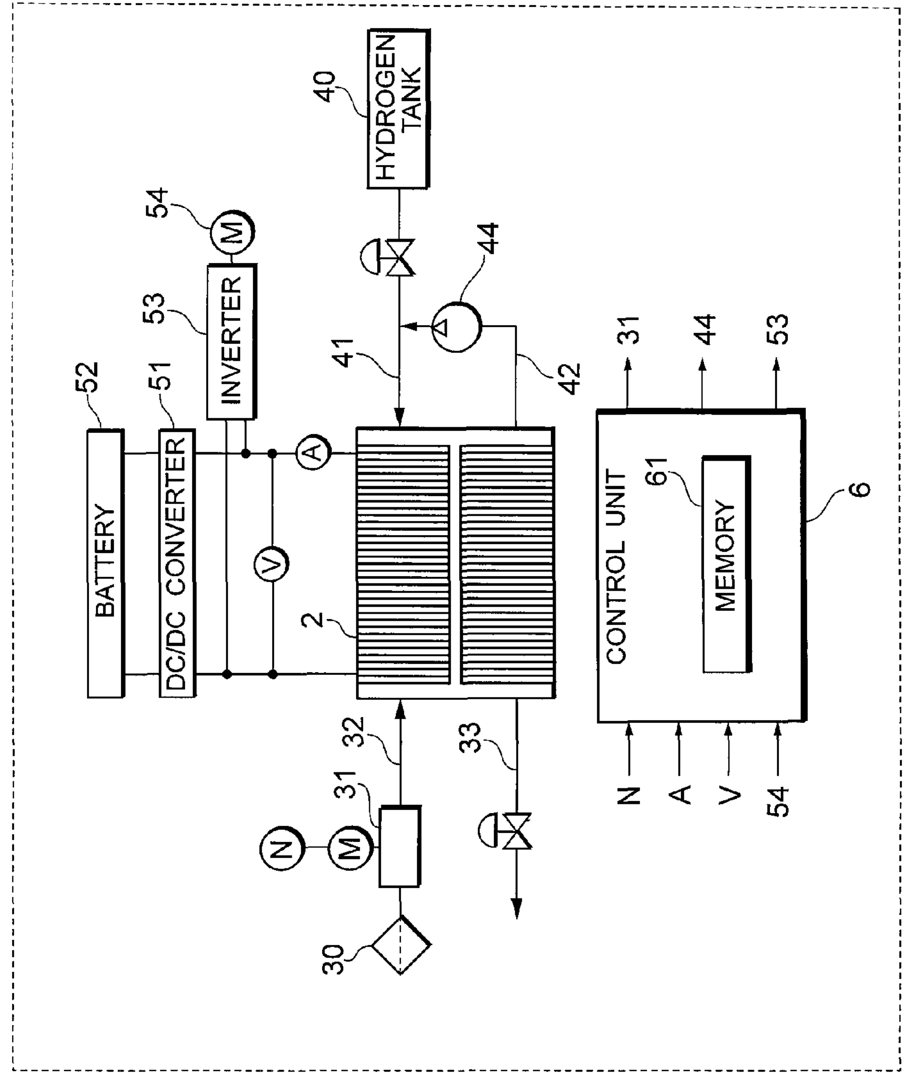
FIG. 1 is a block diagram schematically showing a fuel cell system according to an embodiment.

Referring to FIG. 1, the configuration of the fuel cell system according to this embodiment will be explained. FIG. 1 is a block diagram schematically showing the fuel cell system according to the embodiment.

As shown in FIG. 1, a fuel cell system 1 has: a fuel cell (FC) 2 that generates power from the electrochemical reaction between the reactant gases of oxidizing gas and fuel gas; an oxidizing gas piping system 3 that supplies air as oxidizing gas to the fuel cell 2; a hydrogen gas piping system 4 that supplies hydrogen as fuel gas to the fuel cell 2; a power system 5 that charges/discharges the system; and a control unit 6 that performs overall control of the entire system.

The fuel cell 2 is, for example, a polymer electrolyte fuel cell in which many unit cells are layered to form a stack structure. Each unit cell is constructed to have: an air electrode on one surface of an ion-exchange membrane electrolyte; a fuel electrode on the other surface; and a pair of separators placed such that the air and fuel electrodes are interposed between both separators. Here, hydrogen gas is supplied to a hydrogen gas passage of one separator, and oxidizing gas is supplied to an oxidizing gas passage of the other separator, and when these reactant gases react chemically, power is generated. The fuel cell 2 is provided with a voltage sensor V that detects the output voltage of the fuel cell 2 and an electric current sensor A that detects the output current of the fuel cell 2.

The oxidizing gas piping system 3 has: a compressor 31 that compresses air taken in through a filter 30 and transmits the compressed air as oxidizing gas; an air supply passage 32 for supplying oxidizing gas to the fuel cell 2; and an air discharge passage 33 for discharging oxidant-off gas discharged from the fuel cell 2. The compressor 31 is equipped with a rotation frequency sensor N that detects the rotation frequency of the compressor motor. The amount of oxidizing gas supplied from the compressor 31 can be determined based on the rotation frequency detected by the rotation frequency sensor N.

The hydrogen gas piping system 4 has: a hydrogen tank 40 serving as a fuel supply source that stores high-pressure hydrogen gas; a hydrogen supply passage 41 serving as a fuel supply passage for supplying hydrogen gas in the hydrogen tank 40 to the fuel cell 2; and a circulation passage 42 for flowing back hydrogen-off gas discharged from the fuel cell 2 to the hydrogen supply passage 41. The circulation passage 42 is equipped with a hydrogen pump 44 that pressurizes the hydrogen-off gas in the circulation passage 42 and transmits it to the hydrogen supply passage 41.

The power system 5 has a DC/DC converter 51, a battery 52 that serves as a secondary battery, a traction inverter 53, a traction motor 54, and various auxiliary invertors and the like not shown in the drawing. The DC/DC converter 51 is a direct current voltage converter, and has the functions of: adjusting a direct current voltage input from the battery 52 and outputting it to the traction inverter 53; and adjusting a direct current voltage input from the fuel cell 2 or from the traction motor 54 and outputting it to the battery 52. With the above functions of the DC/DC converter 51, the battery 52 can be charged/discharged. The DC/DC converter 51 also controls the output voltage of the fuel cell 2.

The battery 52 is formed of layered battery cells and has a constant high terminal voltage, and under the control of a battery computer not shown in the drawing, the battery 52 can be charged with excess power and provide supplemental power supply. The traction inverter 53 converts direct current into three-phase alternating current and supplies it to the traction motor 54. The traction motor 54 is, for example, a three-phase AC motor, and constitutes the main power source of the fuel cell vehicle in which the fuel cell system 1 is mounted. The auxiliary inverters are motor controllers that control the drive of each motor, and convert direct current into three-phase alternating current and supply it to each motor. The auxiliary inverters are, for example, pulse width modulation (PWM) inverters, and in accordance with control commands from the control unit 6, convert DC voltage output from the fuel cell 2 or from the battery 52 into three-phase AC voltage and control the rotating torque generated in each motor.

The control unit 6 detects a manipulated amount of an accelerating member (e.g., accelerator) provided in the fuel cell vehicle, receives control information including a required value of acceleration (for example, a power generation amount required by a power-consuming device such as the traction motor 54), and controls the operation of various devices in the system. Note that examples of the power-consuming device include, other than the traction motor 54, auxiliary devices necessary for the operation of the fuel cell 2 (such as the compressor 31 and a motor for the hydrogen pump 44), actuators used in various devices related to the vehicle running (transmission, wheel controller, steering device, suspension, etc.), an air conditioning device (air conditioner) for the passenger space, a lighting device, an audio player, and the like.

The control unit 6 (output limitation means) performs output-limitation processing for limiting the output from the fuel cell 2. The output-limitation processing is processing that reduces the amount of power generation by the fuel cell 2 to less than or equal to a predetermined power generation limit which is lower than the required power generation amount, so that a stoichiometric ratio of the oxidizing gas (hereinafter called as an "air stoichiometric ratio") is maintained within a predetermined allowable range. The term "air stoichiometric ratio" used herein means the ratio of the excess of the oxidizing gas supplied to the fuel cell 2 with respect to the amount of oxidizing gas consumed by the fuel cell 2. The predetermined power generation limit refers to a power generation amount when the air stoichiometric ratio reaches the upper limit of the predetermined allowable range. In the fuel cell system 1, the fuel cell 2 is operated in a state where the air stoichiometric ratio is set to a particular value calculated by means of experiments, etc., so as to reduce power loss and realize high power-generation efficiency. Accordingly, by performing the output-limitation processing and controlling the air stoichiometric ratio not to go beyond an allowable range including the particular value, power loss can be reduced and high power-generation efficiency can be realized.

The control unit 6 (high-voltage prevention means) performs, under a predetermined condition that permits prevention of a high-voltage state, high-voltage-prevention processing for preventing the fuel cell 2 from being in a high-voltage state. This high-voltage-prevention processing is processing for reducing the output voltage of the fuel cell 2 to less than or equal to a predetermined high-voltage-prevention voltage. More specifically, the output voltage is compared to the high-voltage-prevention voltage, and if it exceeds the high-voltage-prevention voltage, the control unit 6 determines that the output voltage of the fuel cell 2 should be forced to decrease, and forces the output voltage of the fuel cell 2 to decrease to less than or equal to the high-voltage-prevention voltage. Here, a specific value to which the output voltage of the fuel cell 2 is reduced may be arbitrarily determined. If the output voltage is less than or equal to the high-voltage-prevention voltage, the control unit 6 determines that there is no need to force the output voltage of the fuel cell 2 to decrease. By performing the high-voltage-prevention processing, the output voltage of the fuel cell can be reduced to less than or equal to the high-voltage-prevention voltage, and consequently a high-voltage state can be prevented.

The predetermined condition permitting high-voltage prevention includes various conditions for performing the high-voltage-prevention processing, and if the condition permitting high-voltage prevention is not satisfied, the high-voltage-prevention processing is prohibited. Examples of cases where the condition permitting high-voltage prevention is not satisfied include situations where the disadvantages caused by performing the high-voltage-prevention processing are greater than the disadvantages caused by being in a high-voltage state, e.g., the case where the fuel cell is in a power-generation state for controlling rapid warm-up, the case where the vehicle speed is or exceeds a predetermined speed, and the case where the battery 52 cannot be charged.

The high-voltage-prevention voltage is determined in advance by means of experiments, etc., and stored in internal memory 61 of the control unit 6, for example, upon a shipment after manufacturing. The high-voltage-prevention voltage may be a fixed value, and it may also be a value that can be repeatedly rewritten according to, for example, an ambient environment (outside air temperature, fuel cell temperature, humidity, operation mode, etc.).

Figure 2:
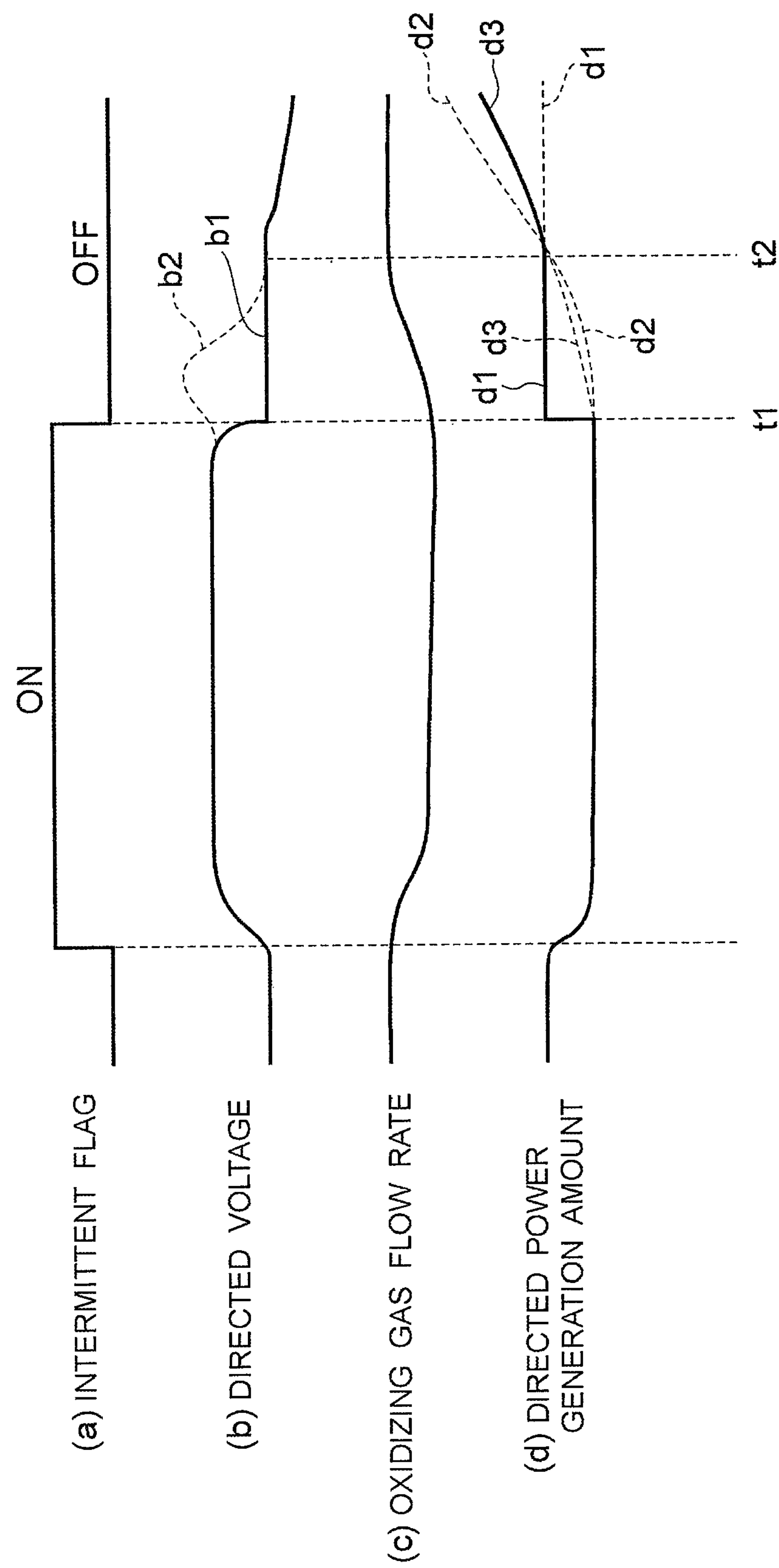
FIG. 2 is a timing chart for explaining the content of control by a control unit.

Here, when performing both of the output-limitation processing and the high-voltage-prevention processing together, the output voltage determined by the high-voltage-prevention processing is, in some cases, cancelled by the output-limitation processing. This situation will be described below more specifically referring to FIG. 2. In FIG. 2, timing t1 shows a point in time when an intermittent flag shown in FIG. 2(*a*) is switched from on to off, namely, a point in time when the operation mode of the fuel cell 2 is switched from an intermittent operation mode to a normal operation mode. Meanwhile, timing t2 shows a point in time when shortage of the oxidizing gas flow rate shown in FIG. 2(*c*) has been solved, namely, a point in time when a lag in the supply of oxidizing gas has been solved.

As shown in FIG. 2, immediately after the switching from an intermittent operation to a normal operation at t1, the voltage directed to the fuel cell 2, which is shown in FIG. 2(*b*), may go over the high-voltage-prevention voltage (voltage shown by a solid line b1 between t1 and t2), as shown by a dotted line b2. In other words, the voltage determined by the high-voltage-prevention processing may be cancelled, resulting in the output voltage becoming higher than the high-voltage-prevention voltage.

As already described above, since a high-voltage state can be prevented if the output voltage of the fuel cell can be reduced to less than or equal to the high-voltage-prevention voltage, the high-voltage-prevention processing is performed to force the output voltage of the fuel cell to decrease to less than or equal to the high-voltage-prevention voltage. However, for example, if the remaining oxidizing gas in the stack is consumed during an intermittent operation and if the operation is thereafter switched from the intermittent operation to a normal operation, the oxidizing gas flow rate becomes insufficient, causing a lag in the supply of oxidizing gas, as shown between t1 and t2 in FIG. 2(*c*). In the above case, in order to maintain the air stoichiometric ratio, the power generation amount directed to the fuel cell is limited to less than or equal to the power generation limit which is determined by the output-limitation processing. More specifically, the directed power generation amount shown in FIG. 2(*d*) is reduced to the power generation limit shown by a dotted line d2 between t1 and t2, without being the high-voltage-prevention power generation amount (powergeneration amount determined corresponding to the high-voltage-prevention voltage), which is shown by a solid line d1 between t1 and t2. In this case, the directed power generation amount between t1 and t2 in FIG. 2(*d*) is smaller than the high-voltage-prevention power generation amount shown by the solid line d1 between t1 and t2.

Figure 3:
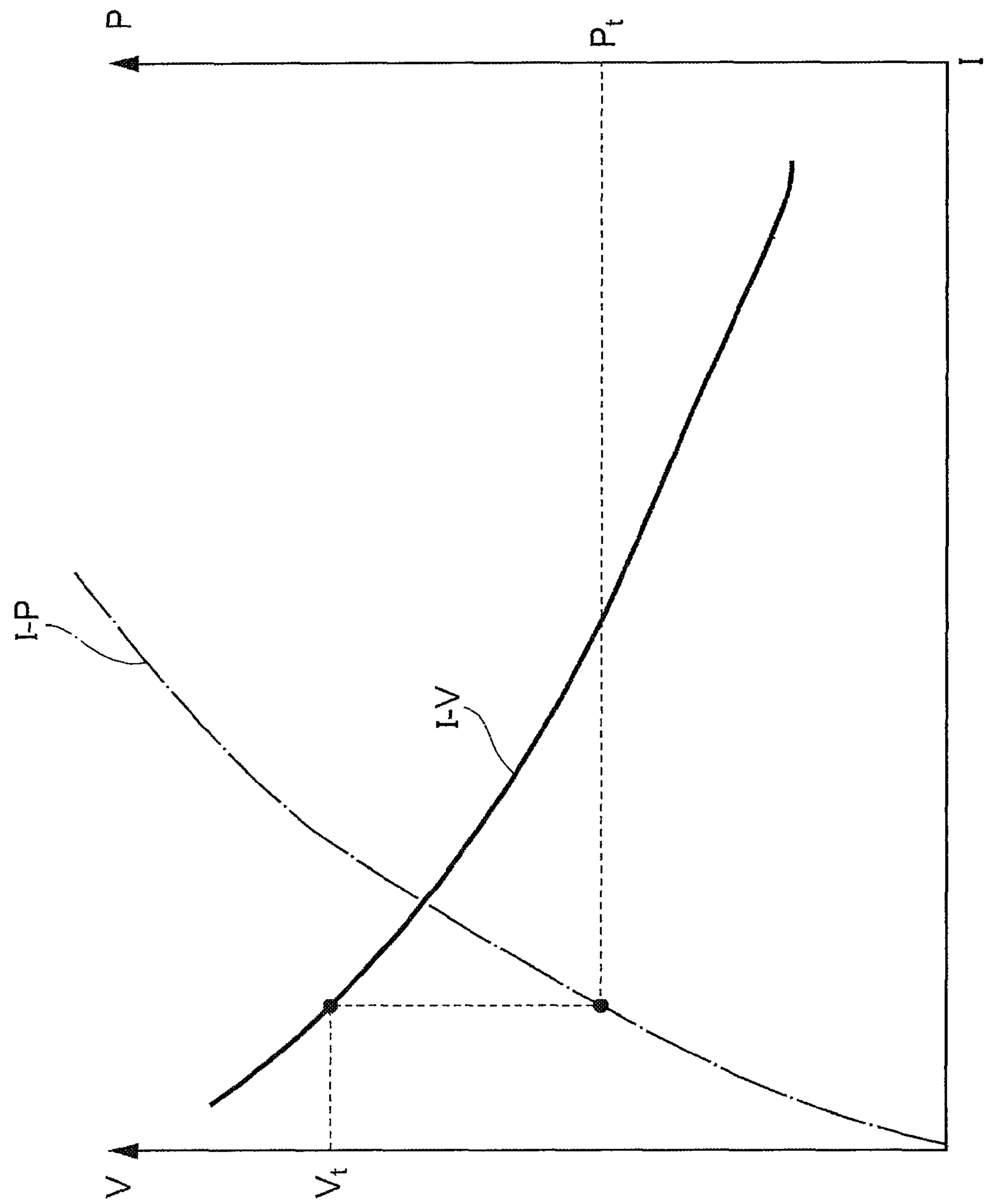
FIG. 3 is a diagram showing I-V and I-P characteristics of a fuel cell.

Referring now to the characteristic map shown in FIG. 3, the relationship between the output voltage and the power generation amount in the fuel cell will be explained. FIG. 3 is a characteristic map illustrating the I-V and I-P characteristics of the fuel cell. This characteristic map is obtained in advance by means of experiments, etc., and stored in the internal memory 61 of the control unit 6, for example, upon a shipment after manufacturing. Values in this characteristic map may be fixed values, and may also be values that can be repeatedly rewritten.

In FIG. 3, Vt shows the high-voltage-prevention voltage and Pt shows the high-voltage-prevention power generation amount. As shown in FIG. 3, the relationship between an output voltage V and a power generation amount P is as follows: as the output voltage V increases, the power generation amount P decreases, and as the output voltage V decreases, the power generation amount P increases. In the fuel cell whose output voltage V and power generation amount P have the above relationship, if the directed power generation amount P becomes smaller than the high-voltage-prevention power generation amount Pt immediately after the operation is switched from an intermittent operation to a normal operation, the directed voltage V becomes greater than the high-voltage-prevention voltage Vt. In other words, as shown by the dotted line b2 in FIG. 2(*b*), the directed voltage increases over the high-voltage-prevention voltage shown by the solid line b1 between t1 and t2.

In order to solve the above problem, from the time when the operation mode of the fuel cell 2 has been switched from an intermittent operation mode to a normal operation mode until the shortage of the oxidizing gas supply is solved, and where the above-described condition permitting high-voltage prevention is satisfied, the control unit 6 (prohibition means) prohibits the output-limitation processing performed in accordance with the oxidizing gas supply. As a result, it is possible to avoid a situation where the high-voltage-prevention processing is cancelled by the execution of the output-limitation processing. In other words, it is possible to avoid a situation where, upon activation of the fuel cell after an intermittent operation, the directed voltage V provided to the fuel cell exceeds the high-voltage-prevention voltage Vt and the fuel cell goes into a high-voltage state.

The processing performed by the control unit 6 as a prohibition means will be more specifically described with reference to (b) and (d) in FIG. 2. The voltage shown by the solid line b1 between t1 and t2 is a high-voltage-prevention voltage Vt. The power generation amount shown by the solid and dotted line d1 after t1 is a high-voltage-prevention power generation amount Pt. The power generation amount shown by the dotted line d2 after t1 is a power generation limit determined by the output-limitation processing. The power generation amount shown by the dotted and solid line d3 after t1 is a power generation amount required for the fuel cell. The period from t1 to t2 is a period during which a lag in the supply of oxidizing gas occurs after the intermittent operation.

When the operation is switched from an intermittent operation to a normal operation at t1 (assumed as being under a condition permitting high-voltage prevention) as shown in FIG. 2(*a*), the control unit 6 prohibits the output-limitation processing. As a result, as shown by b1 in FIG. 2(*b*), the directed voltage between t1 and t2 is reduced to the high-voltage-prevention voltage Vt by the high-voltage-prevention processing, and as shown by d1 in FIG. 2(*d*), the directed power generation amount between t1 and t2 is set to the high-voltage-prevention power generation amount Pt which corresponds to the high-voltage-prevention voltage Vt. If the directed power generation amount can be set to the high-voltage-prevention power generation amount Pt as described above, a situation where the high-voltage-prevention voltage Vt (voltage which corresponds to the high-voltage-prevention power generation amount Pt) determined by the high-voltage-prevention processing is cancelled can be avoided.

Note that if the directed power generation amount is set to the high-voltage-prevention power generation amount Pt between t1 and t2, and if the oxidizing gas supply is nevertheless insufficient, then the output current would not meet the required amount and accordingly, an attempt to generate power in the directed power generation amount would end unsuccessfully. If the operation in the above state continues for a long time, it would impose a burden to the fuel cell stack; however, it is advantageous in comparison with the case where the fuel cell goes into a high-voltage state because deterioration of the stack can be reduced. In addition, by limiting the above operation to a short period of time between t1 and t2, deterioration of the stack can be minimized.

When the shortage of the oxidizing gas supply has been solved at timing t2 as shown in FIG. 2(*c*), the control unit 6 cancels the prohibition of the output-limitation processing. As a result, the output-limitation processing is started to be performed. Note that, in FIG. 2(*d*), after t2, the required power generation amount is itself output as the directed power generation amount. This is because: the power generation amount required for the fuel cell, which is shown by the solid line d3 in FIG. 2(*d*), is smaller than the power generation limit shown by the dotted line d2, and thus, the fuel cell is exempted from the limitation by the output-limitation processing; and the required power generation amount shown by the solid line d3 is greater than the high-voltage-prevention power generation amount shown by the dotted line d1, and thus, the fuel cell is also exempted from the forced reduction of the output voltage by the high-voltage-prevention processing.

Whether or not the shortage of the oxidizing gas supply has been solved can be determined, for example, in the following manner. The control unit 6 (determination means) compares the rotation frequency detected by the rotation frequency sensor N and the rotation frequency directed to the compressor 31, determines whether the detected rotation frequency is smaller than the directed rotation frequency and there is a gap between the detected rotation frequency and the directed rotation frequency, and thereby determines whether or not the shortage of the oxidizing gas supply has been solved. If there is a gap between the detected rotation frequency and the directed rotation frequency, the control unit 6 determines that the oxidizing gas supply is insufficient with respect to the required amount of supply. If there is no gap between the detected rotation frequency and the directed rotation frequency, i.e., if they are close or equal, the control unit 6 determines that the oxidizing gas supply is sufficient with respect to the required amount of supply, that is, determines that the shortage of the oxidizing gas supply has been solved.

Here, the control unit 6 physically has, for example, a CPU, a ROM and an HDD for storing control programs and control data processed by the CPU, a RAM mainly used as various work areas for control processing, and an I/O interface. These components are connected to each other via a bus. Various sensors including the rotation frequency sensor N, the electric current sensor A and the voltage sensor V are connected to the I/O interface, and various drivers for driving the compressor 31, the hydrogen pump 44, etc., are also connected to the I/O interface.

In accordance with the control programs stored in the ROM, the CPU receives the results of detection by various sensors through the I/O interface and processes them using various data, etc., in the RAM, and as a result, the CPU controls, for example, the above-mentioned output-limitation processing and high-voltage-prevention processing. Furthermore, the CPU outputs control signals to various drivers through the I/O interface, and thereby controls the entire fuel cell system 1.

Figure 4:
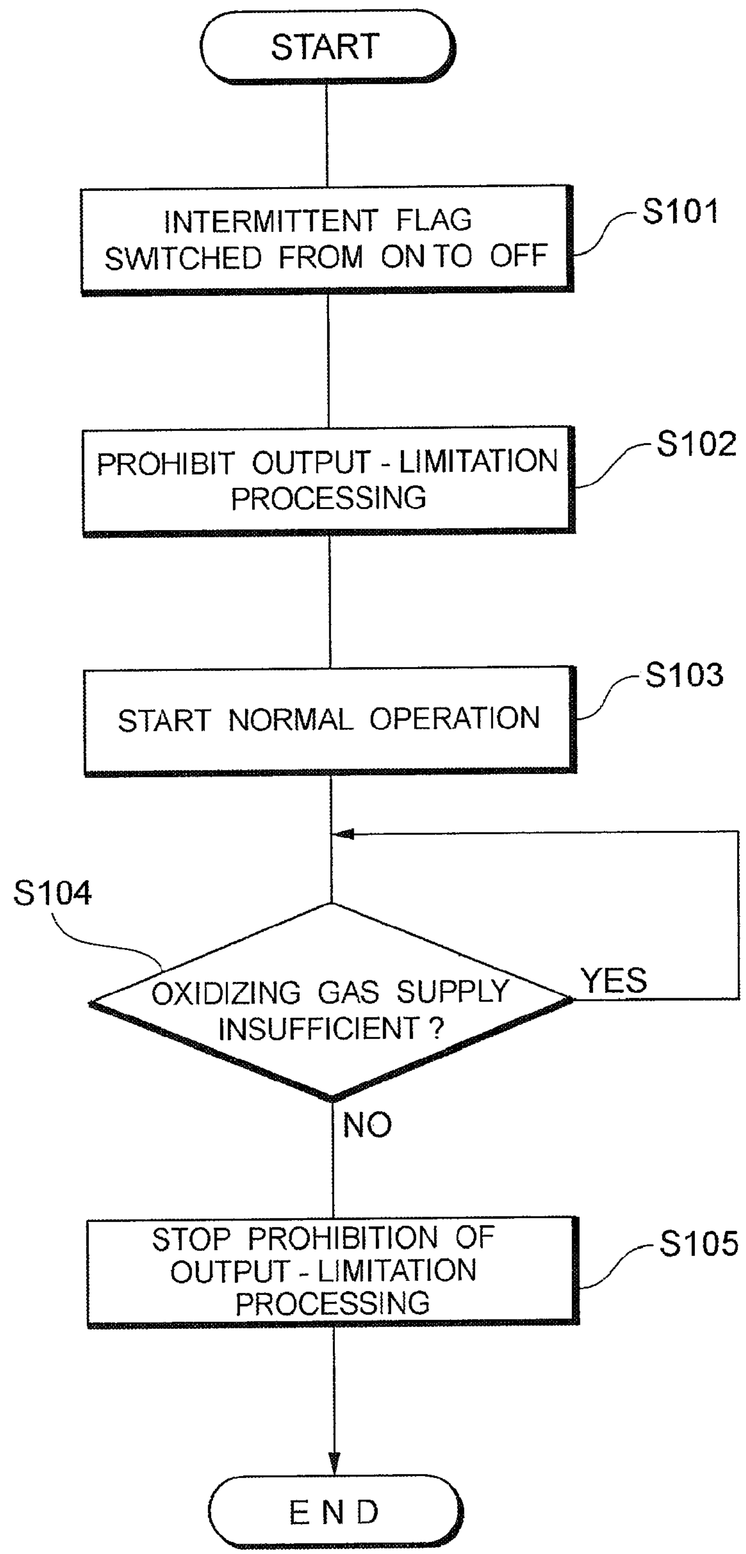
FIG. 4 is a flowchart for explaining processing for prohibiting output-limitation processing.

Next, the processing for prohibiting the output-limitation processing will be explained using the flowchart shown in FIG. 4.

First, when an intermittent flag is switched from on to off under a condition permitting high-voltage prevention (step S101), the control unit 6 prohibits the output-limitation processing (step S102) and starts normal operation (step S103).

The control unit 6 then determines whether the oxidizing gas supply is insufficient with respect to the required amount of supply (step S104). If the result of the above determination is YES (step S104: YES), the control unit 6 repeats the determination at step S104.

If the oxidizing gas supply is determined as being sufficient with respect to the required amount of supply in step S104 above (step S104: NO), the control unit 6 stops the prohibition of the output-limitation processing (step S105). In other words, the output-limitation processing is started to be performed from that time.

As described above, according to the fuel cell system 1 in this embodiment, it is possible to prohibit the output-limitation processing, under a condition permitting high-voltage prevention, upon activation after an intermittent operation, until the shortage of the oxidizing gas supply has been solved. Accordingly, even if the oxidizing gas supply is insufficient upon activation after an intermittent operation, the amount of power generation by the fuel cell 2 can be prevented from being reduced by the output-limitation processing to less than or equal to the power generation limit, which is lower than the required power generation amount. As a result, upon activation after an intermittent operation under a condition permitting high-voltage prevention, it is possible to ensure that the high-voltage-prevention processing is performed and the output voltage of the fuel cell is thereby reduced to less than or equal to the high-voltage-prevention voltage. In other words, it is possible to ensure that a high-voltage state is prevented upon activation of the fuel cell.

Furthermore, when the prohibition of the output-limitation processing is cancelled, the amount of power generation by the fuel cell can be reduced to less than or equal to the power generation limit, and accordingly, unnecessary power loss can be reduced and high power-generation efficiency can be realized.

Note that the period of prohibiting the output limitation may be restricted. For example, the control unit 6 (cancelling means) may cancel the prohibition of the output limitation when a predetermined period of time has passed after the activation of the fuel cell 2. As a result, for example, even in the case where, upon activation of the fuel cell, the output continues to exceed the power generation limit d2, for example, by the continuous pressing of the accelerator by the vehicle driver, it is possible to prevent such a burdensome output from continuing for a long time, and to consequently reduce deterioration of the fuel cell.

A particular time of the cancellation may be determined, taking into consideration, for example, the time determined according to an expected lag in the supply of oxidizing gas due to the response lag of the compressor 31 upon activation of the fuel cell 2, the time from the activation of the fuel cell 2 until the oxidizing gas flow rate reaches a particular value determined in advance, and the time from the activation of the fuel cell 2 until the rotation frequency of the compressor 31 reaches a particular value determined in advance.

Furthermore, in the above-described embodiment, the prohibition of the output limitation is stopped on the condition that the shortage of the oxidizing gas supply has been solved, but the condition for stopping the prohibition is not limited to such condition. For example, the prohibition of the output limitation may be stopped when both of the power generation amount required for the fuel cell and the power generation limit increase to greater than or equal to the high-voltage-prevention power generation amount. In short, if the prohibition of the output limitation is stopped when the situation becomes such that the required power generation amount would not be reduced in accordance with the power generation limit to less than or equal to the high-voltage-prevention power generation amount, the voltage determined by the high-voltage-prevention processing would not be cancelled.

More specifically, the control unit 6 (determination means) determines whether or not both of the required power generation amount and the power generation limit are greater than or equal to the high-voltage-prevention power generation amount, which corresponds to the high-voltage-prevention voltage. The control unit 6 (prohibition means) prohibits the output-limitation processing, under a condition permitting high-voltage prevention, from the time when the fuel cell operation mode has been switched from an intermittent operation mode to a normal operation mode until both of the required power generation amount and the power generation limit are determined as being greater than or equal to the high-voltage-prevention power generation amount.

As a result, it is possible to prohibit the output-limitation processing upon activation of the fuel cell until both of the required power generation amount and the power generation limit become greater than or equal to the high-voltage-prevention power generation amount, and accordingly, it is possible to ensure that, upon activation after an intermittent operation, the high-voltage-prevention processing is performed and the output voltage of the fuel cell is thereby reduced to less than or equal to the high-voltage-prevention voltage. In other words, it is possible to ensure that the fuel cell is prevented from going into a high-voltage state upon activation of the fuel cell.

Furthermore, in the above embodiment, the control unit 6 prohibits the output-limitation processing when the operation mode is switched from the intermittent operation mode to the normal operation mode, but the timing of starting the prohibition of the output-limitation processing is not limited to the above. For example, the prohibition of the output-limitation processing may be started when the fuel cell 2 is activated upon start-up of the engine. In other words, what is necessary is that the prohibition of the output-limitation processing is started upon activation of the fuel cell 2 in cases where a lag in the supply of oxidizing gas could occur.

Furthermore, in the above embodiment, the control unit 6 determines that the oxidizing gas supply is insufficient with respect to the required amount of supply if there is a gap between the detected rotation frequency and the directed rotation frequency, but the condition for determining excess or deficiency is not be limited to the above. For example, the oxidizing gas supply may be determined as being insufficient with respect to the required amount of supply if the detected rotation frequency is smaller than the directed rotation frequency.

Furthermore, while the above embodiment explains the case where a fuel cell vehicle is equipped with the fuel cell system according to the present invention, various movable objects other than fuel cell vehicles (robots, ships, planes, etc.) can also be equipped with the fuel cell system according to the present invention. Furthermore, the fuel cell system according to the present invention can also be utilized in fixed power generation systems used as power generation equipment in buildings (houses, office buildings, etc.).

INDUSTRIAL APPLICABILITY

The fuel cell system according to the present invention is suitable for use in preventing a fuel cell from going into a high-voltage state upon activation of the fuel cell.

The invention claimed is:

1. A fuel cell system comprising:

a fuel cell that is supplied with reactant gases and generates power from an electrochemical reaction of the reactant gases;

a high-voltage prevention unit that, under a predetermined condition permitting high-voltage prevention, prevents a high-voltage state by reducing an output voltage of the fuel cell to less than or equal to a predetermined high-voltage-prevention voltage;

a compressor that supplies the fuel cell with oxidizing gas which is one of the reactant gases;

a control unit having a CPU, a ROM and a hard disk drive for storing control programs and control data processed by the CPU, a RAM for control processing, and an I/O interface, the control unit programmed to:

limit an output from the fuel cell by reducing an amount of power generation by the fuel cell to less than or equal to a predetermined power generation limit which is lower than a required power generation amount, so that a stoichiometric ratio of the oxidizing gas is maintained within a predetermined allowable range, and increases a required voltage with an output limitation unit; and prohibit the limitation by the output limitation unit for a period from activation of the fuel cell until the oxidizing gas supply meets a required amount of supply and where the condition permitting high-voltage prevention is satisfied with a prohibition unit, wherein the prohibition unit further includes a determination unit that determines that the condition permitting high-voltage prevention is not satisfied when the fuel cell is in a power-generation state for controlling rapid warm-up and when the battery cannot be charged.

2. The fuel cell system according to claim 1, wherein the determination unit determines whether or not the oxidizing gas supply meets the required amount of supply, wherein the prohibition unit prohibits the limitation by the output limitation unit upon activation of the fuel cell until the determination unit determines that the oxidizing gas supply meets the required amount of supply.

3. The fuel cell system according to claim 2, further comprising a rotation frequency sensor that detects a rotation frequency of a motor of the compressor, wherein the determination unit determines that the oxidizing gas supply does not meet the required amount of supply if there is a gap between the rotation frequency detected by the rotation frequency sensor and a rotation frequency directed to the compressor.

4. The fuel cell system according to claim 3, wherein the determination unit determines that the oxidizing gas supply does not meet the required amount of supply if the rotation frequency detected by the rotation frequency sensor is smaller than the rotation frequency directed to the compressor.

5. The fuel cell system according to claim 1, wherein the predetermined period of time is a period from activation of the fuel cell until both of the power generation limit and the required power generation amount for the fuel cell increase to greater than or equal to a high-voltage-prevention power generation amount which corresponds to the high-voltage-prevention voltage.

6. The fuel cell system according to claim 5, wherein the determination unit determines whether or not both of the power generation limit and the required power generation amount are greater than or equal to the high-voltage-prevention power generation amount, wherein the prohibition unit prohibits the limitation by the output limitation unit upon activation of the fuel cell until the determination unit determines that the power generation limit and the required power generation amount are greater than or equal to the high-voltage-prevention power generation amount.

7. The fuel cell system according to claim 1, wherein the activation of the fuel cell is an activation following completion of an intermittent operation in the fuel cell.

8. The fuel cell system according to claim 1, wherein the control unit further comprises a cancellation unit that cancels the prohibition by the prohibition unit when a predetermined period of time has passed from the activation of the fuel cell.

* * * * *

UNITED STATES PATENT AND TRADEMARK OFFICE

CERTIFICATE OF CORRECTION

PATENT NO. : 9,017,888 B2
APPLICATION NO. : 12/934460
DATED : April 28, 2015
INVENTOR(S) : M. Yoshida It is certified that error appears in the above-identified patent and that said Letters Patent is hereby corrected as shown below:

Specification

At column 1, line 5, change "2008-078252 filed 25 May 2008," to -- 2008-078252 filed 25 Mar. 2008, --.

At column 7, line 1, change "(powergeneration amount" to -- (power generation amount --.

Signed and Sealed this
Twenty-ninth Day of December, 2015

Michelle K. Lee
*Director of the United States Patent and Trademark Office*